(12) United States Patent
Park et al.

(10) Patent No.: US 12,013,235 B2
(45) Date of Patent: Jun. 18, 2024

(54) ABSOLUTE POSITION MEASUREMENT USING SINGLE MAGNET STRIP

(71) Applicant: Infineon Technologies AG, Neubiberg (DE)

(72) Inventors: Joo Il Park, Sungnam (KR); Gernot Binder, Klagenfurt (AT); Dirk Hammerschmidt, Finkenstein (AT); Christoph Oswald, Munich (DE); Armin Satz, Villach (AT)

(73) Assignee: Infineon Technologies AG, Neubiberg (DE)

( * ) Notice: Subject to any disclaimer, the term of this patent is extended or adjusted under 35 U.S.C. 154(b) by 196 days.

(21) Appl. No.: 17/588,540

(22) Filed: Jan. 31, 2022

(65) Prior Publication Data

US 2023/0243635 A1    Aug. 3, 2023

(51) Int. Cl.
*G01B 7/00* (2006.01)
*G01D 5/14* (2006.01)

(52) U.S. Cl.
CPC ............. *G01B 7/003* (2013.01); *G01D 5/145* (2013.01)

(58) Field of Classification Search
CPC ................................ G01B 7/003; G01D 5/145
See application file for complete search history.

(56) References Cited

U.S. PATENT DOCUMENTS

| | | | |
|---|---|---|---|
| 2017/0089726 A1* | 3/2017 | Scherr ................. | G01D 5/2006 |
| 2022/0196434 A1* | 6/2022 | Park ..................... | G01R 33/091 |

* cited by examiner

*Primary Examiner* — Reena Aurora
(74) *Attorney, Agent, or Firm* — Harrity & Harrity, LLP (57) ABSTRACT

An absolute position measurement system includes a multipole magnet including alternating magnetic poles extending along a multipole extension direction, the multipole magnet has a linear changing configuration relative to a linear path and produces a magnetic field having a field strength that undergoes a sinusoidal change along the linear path due to the alternating magnetic poles and a linear change along the linear path according to the linear changing configuration relative to the linear path; and a magnetic sensor configured to move along the linear path. The magnetic sensor includes a first sensor element arrangement configured to generate a first sensor signal, a second sensor element arrangement configured to generate a second sensor signal that is phase shifted with respect to the first sensor signal, and a processing circuit configured to calculate an absolute position of the magnetic sensor based on the first sensor signal and the second sensor signal.

23 Claims, 7 Drawing Sheets

ABSOLUTE POSITION MEASUREMENT USING SINGLE MAGNET STRIP

FIELD

The present disclosure generally relates to position sensing and, more particularly, to absolute position sensing using a magnetic field sensor and a single magnet strip.

BACKGROUND

Linear magnetic position sensors can sense the linear movement relative to a multipole magnetic strip. An absolute linear movement measurement can be performed using the Nonius-Vernier principle, but it requires two multipole magnetic strips and two magnetic sensors. The Nonius-Vernier principle allows to measure the absolute position by means of two tracks consisting of periodic divisions. The number of periods of the two tracks must differ by one and they must be in phase at both ends. The one with more periods is called master track, while the other one is called Nonius track. However, the requirement of using two multipole magnetic strips and two magnetic sensors increases both cost and space.

Absolute linear movement can also be measured using a single multipole magnetic strip by measuring a relative position, but the measurement requires use of a reference position at power on reset of the system to determine an absolute position. In other words, the position of the sensor relative to the multipole magnetic strip needs to be reset to a reference position each time the system is powered on. However, some applications do not allow a sensor to be moved back to a reference position at every power on reset. Thus, this technique cannot be used in those applications.

Accordingly, an absolute linear position measurement system that does not require two multipole magnetic strips and does not require a power on reset to a reference position may be desired.

SUMMARY

Magnetic sensor modules, systems, and methods are provided, configured to detect an absolute position of an object.

One or more embodiments provide an absolute position measurement system, including: a multipole magnet including alternating magnetic poles extending along a multipole extension direction, wherein the multipole magnet has a linear changing configuration relative to a linear path and the multipole magnet is configured to produce a magnetic field along the linear path; and a magnetic sensor configured to move along the linear path. The magnetic sensor includes a first sensor element arrangement configured to generate a first sensor signal in response to the magnetic field and a second sensor element arrangement configured to generate a second sensor signal in response to the magnetic field. As the magnetic sensor moves along the linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform. The magnetic sensor further includes a processing circuit configured to receive the first sensor signal and the second sensor signal and calculate an absolute position of the magnetic sensor based on the first sensor signal and the second sensor signal.

One or more embodiments provide an absolute position measurement system, including: a multipole magnet including alternating magnetic poles extending along a multipole extension direction, wherein the multipole magnet has a linear changing configuration relative to a linear path and the multipole magnet is configured to produce a magnetic field along the linear path, the magnetic field having a field strength that undergoes a sinusoidal change along the linear path due to the alternating magnetic poles and a linear change along the linear path according to the linear changing configuration relative to the linear path; and a magnetic sensor configured to move along the linear path. The magnetic sensor includes a first sensor element arrangement configured to generate a first sensor signal and a second sensor element arrangement configured to generate a second sensor signal that is phase shifted with respect to the first sensor signal. The magnetic sensor further includes a processing circuit configured to receive the first sensor signal and the second sensor signal and calculate an absolute position of the magnetic sensor based on the first sensor signal and the second sensor signal.

One or more embodiments provide an absolute position measurement system, including: a multipole magnet including alternating magnetic poles extending along a multipole extension direction that is coincident with a linear path along which the multipole magnet is configured to move, wherein the multipole magnet has a linear configuration that changes relative to a fixed position as it moves along the linear path, wherein the multipole magnet is configured to produce a magnetic field at the fixed position; and a magnetic sensor movably fixed at the fixed position. The magnetic sensor includes a first sensor element arrangement configured to generate a first sensor signal in response to the magnetic field and a second sensor element arrangement configured to generate a second sensor signal in response to the magnetic field. As the multipole magnet moves along the linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform. The magnetic sensor further includes a processing circuit configured to receive the first sensor signal and the second sensor signal and calculate an absolute position of the multipole magnet based on the first sensor signal and the second sensor signal.

One or more embodiments provide a method of calculating an absolute position of a magnetic sensor, the method including: generating, by a first sensor element arrangement of the magnetic sensor, a first sensor signal in response to a magnetic field; generating, by a second sensor element arrangement of the magnetic sensor, a second sensor signal in response to the magnetic field, wherein, as the magnetic sensor moves along the linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform; and calculating, by a processing circuit, an absolute position of the magnetic sensor based on the first sensor signal and the second sensor signal.

BRIEF DESCRIPTION OF THE DRAWINGS

Embodiments are described herein making reference to the appended drawings.

DETAILED DESCRIPTION

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a linear position sensor that measures an absolute position of an object by sensing magnetic fields.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back-bias magnet to form a sensor module, sensor device, or the like.

One or more magnetic field sensor elements included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from a magnetic field sensor element in the form of raw measurement data and derives, from the sensor signal, a measurement signal that represents the magnetic field. The sensor circuit may include a digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, Hall effect devices and magneto-resistive sensors, often referred to as XMR sensors which is a collective term for anisotropic magneto-resistive (AMR) sensors, giant magneto-resistive (GMR) sensors, tunneling magneto-resistive (TMR) sensors, etc.

A vertical Hall sensor is a magnetic field sensor constructed with the Hall element perpendicular to the plane of the sensor chip (e.g., extending from a main surface of the chip into the chip body). It senses magnetic fields perpendicular to its defined sensitive edge (top, right, or left, relative to the main surface of the chip). This generally means that a vertical Hall sensor is sensitive to a magnetic field component that extends parallel to their surface and parallel, or in-plane, to the main surface of the chip in which the vertical Hall sensor is integrated. In particular, a vertical Hall sensor may extend from the main surface vertically into the chip (e.g., into a semiconductor substrate). The plane of sensitivity may be referred to herein as a "sensitivity-axis" or "sensing axis" and each sensing axis has a reference direction. For vertical Hall sensor elements, voltage values output by the sensor elements change according to the magnetic field strength in the direction of its sensing axis. For the purposes of this disclosure, a main surface of the sensor chip is defined in the XY plane and a vertical Hall sensor is sensitive to a field in the XY plane (e.g., in the X direction, Y direction, or a direction therebetween).

On the other hand, a lateral (planar) Hall sensor is constructed with the Hall element in the same plane as the main surface of the sensor chip. It senses magnetic fields perpendicular to its planar surface. This means they are sensitive to magnetic fields vertical, or out-of-plane, to the main surface of the chip. The plane of sensitivity may be referred to herein as a "sensitivity-axis" or "sensing axis" and each sensing axis has a reference direction. Similar to vertical Hall sensor elements, voltage values output by lateral Hall sensor elements change according to the magnetic field strength in the direction of its sensing axis. For the purposes of this disclosure, a main surface of the sensor chip is defined in the XY plane and a lateral Hall sensor is sensitive to a field aligned in a Z direction that is perpendicular to the XY plane.

Figure 1:
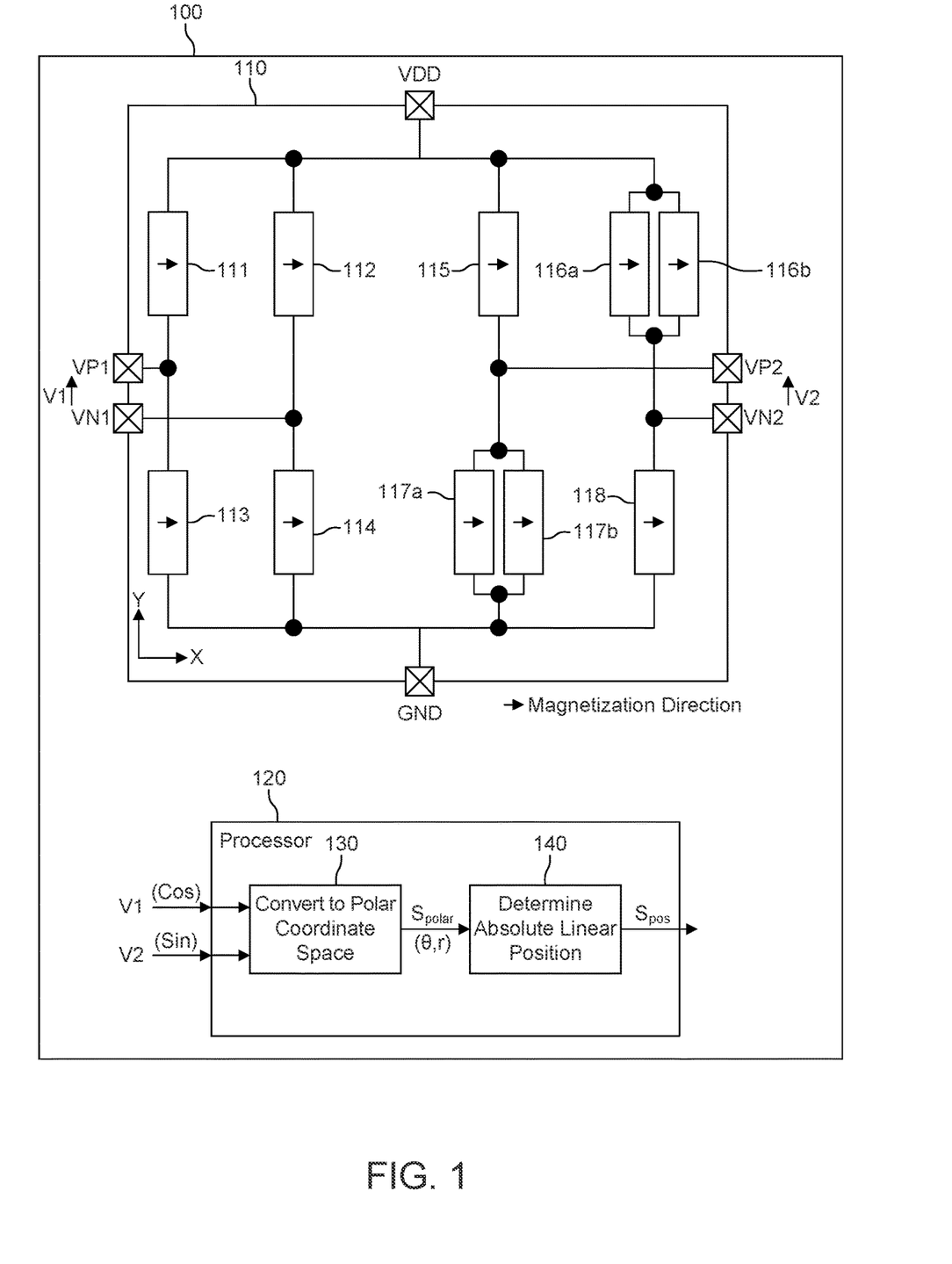
FIG. 1 shows schematic block diagram of an absolute linear position sensor 100 according to one or more embodiments.

FIG. 1 shows schematic block diagram of an absolute linear position sensor 100 according to one or more embodiments. The absolute linear position sensor 100 comprises a magnetic field sensor 110 comprising a first sensor bridge circuit comprising magnetic field sensor elements 111-114 that are sensitive for a first in-plane magnetic field component (e.g., an x-component) produced by a linear multipole strip magnet 150 (not illustrated). The magnetic field sensor elements 111-114 are XMR sensor elements that are arranged in a Wheatstone bridge configuration, with two output terminals VP1 and VN1 being tapped from each leg of the bridge. The first sensor bridge circuit is configured to output a first output signal V1, which is a differential voltage between output terminals VP1 and VN1. In this embodiment, the first output signal V1 is representative of a cosine sensor signal.

The magnetic field sensor 110 further includes a second sensor bridge circuit comprising magnetic field sensor elements 115-118 that are also sensitive for the first in-plane magnetic field component (e.g., an x-component) the linear multipole strip magnet 150. The magnetic field sensor elements 115-118 are XMR sensor elements arranged in a Wheatstone bridge configuration, with two output terminals VP2 and VN2 being tapped from each leg of the bridge. The second sensor bridge circuit is configured to output a second output signal V2, which is a differential voltage between output terminals VP2 and VN2. In this embodiment, the second output signal V2 is representative of a sine sensor signal. In other words, the two output signals V1 and V2 have a 90° phase shift relative to each other. The 90° phase shift is produced due to the pitch or distance between the two bridge circuits relative to the pitch of the poles of the linear multipole strip magnet 150. It will be appreciated that output signal V2 could be considered a cosine signal and that output signal V1 could be considered a sine signal, or vice versa. The two output signals V1 and V2 are provided to a sensor circuit 120 of the magnetic field sensor 110 and are used for absolute linear position calculation and determination.

The magnetization directions of reference layers of the magneto-resistors of the first sensor bridge circuit 111-114 are parallel or anti-parallel to second magnetization directions of reference layers of magneto-resistors of the second sensor bridge circuit 115-118. The magnetization directions of reference layers may be parallel or anti-parallel to the magnetic field component which should be sensed. The magneto-resistors of the first sensor bridge circuit 111-114 are arranged in-plane on a common substrate with the magneto-resistors of the second sensor bridge circuit 115-118. The respective centers of the first sensor bridge circuit 111-114 and of the second sensor bridge circuit 115-118 are spaced apart along sensor x-axis by physical distance.

It is also noted that magnetic field sensor elements 116a and 116b are connected in parallel in an upper segment of the right leg of the second sensor bridge circuit and magnetic field sensor elements 117a and 117b are connected in parallel in a lower segment of the left leg of the second sensor bridge circuit (i.e., catty corner to the upper right segment).

Magnetic field sensor elements 116a and 116b are located on opposite sides of the sensor IC (e.g., 116a is placed on the right side and 116b is placed on the left side) and magnetic field sensor element 115 is placed in the center of the sensor IC. In this way, measurements by 116a and 116b are combined from two different locations in one leg of the bridge and have the same total resistance as for the magnetic field sensor element 115 placed in the center of the bridge, which is forming the opposite leg.

Likewise, magnetic field sensor elements 117a and 117b are located on opposite sides of the sensor IC (e.g., 117a is placed on the right side and 117b is placed on the left side) and magnetic field sensor element 118 is placed in the center of the sensor IC. In this way, measurements by 117a and 117b are combined from two different locations in one leg of the bridge and have the same total resistance as for the magnetic field sensor element 118 placed in the center of the bridge, which is forming the opposite leg.

It is further noted that the magnetic field sensor 110 is not limited to XMR sensor elements. For example, being sensitive to in-plane magnetic field components, vertical Hall effect sensor elements may be used that are appropriately spaced relative to each other to generate the two output signals V1 and V2 that have a 90° phase shift relative to each other. For example, the first sensor bridge circuit may be replaced with one or more first Hall effect sensor elements and the second sensor bridge circuit may be replaced with one or more second Hall effect sensor elements. The sensor signals from the first Hall effect sensor elements can be combined by the sensor circuit 120 in a way to generate the first output signal V1 and the sensor signals from the second Hall effect sensor elements can be combined by the sensor circuit 120 in a way to generate the second output signal V2.

The sensor circuit 120 may include at least one processor and one or more signal conditioning components that enable the sensor circuit to process the output signals V1 and V2 and ultimately determine the absolute linear position of the absolute linear position sensor 100 relative to the linear multipole strip magnet 150 and/or relative to a range of linear positions. The absolute linear position may refer to the sensors' absolute linear position on its linear path 202, an absolute linear (minimum) distance d of the sensor 100 to the magnet 150, or, in the case that the sensor 100 is fixed and the magnet 150 is movable, the magnets' absolute linear position on its linear path 201.

The sensor circuit 120 is configured to perform an absolute position measurement. It includes a converter 130 that is configured to convert the two output signals V1 and V2 from (V1, V2 space) into a measurement signal Spolar in a polar coordinate space (θ, r), where θ is an angular coefficient and r is a radius coefficient. Each point in the polar coordinate space is determined by a distance (i.e., a radius) from a reference point and an angle θ from a reference direction (e.g., from the V1 axis).

The sensor circuit 120 further includes an absolute position calculation unit 140 that receives the measurement signal Spolar and calculates the absolute linear position therefrom. The absolute position calculation unit 140 then generates a position output signal Spos representative of the absolute linear position. The converter 130 and the absolute position calculation unit 140 may be the same or different processors that are configured to perform the signal conversion and absolute linear position calculation, respectively. Accordingly, the sensor circuit 120 comprises one or more processors or processing circuits that are configured to determine the absolute linear position based on output signals V1 and V2.

Figure 2:
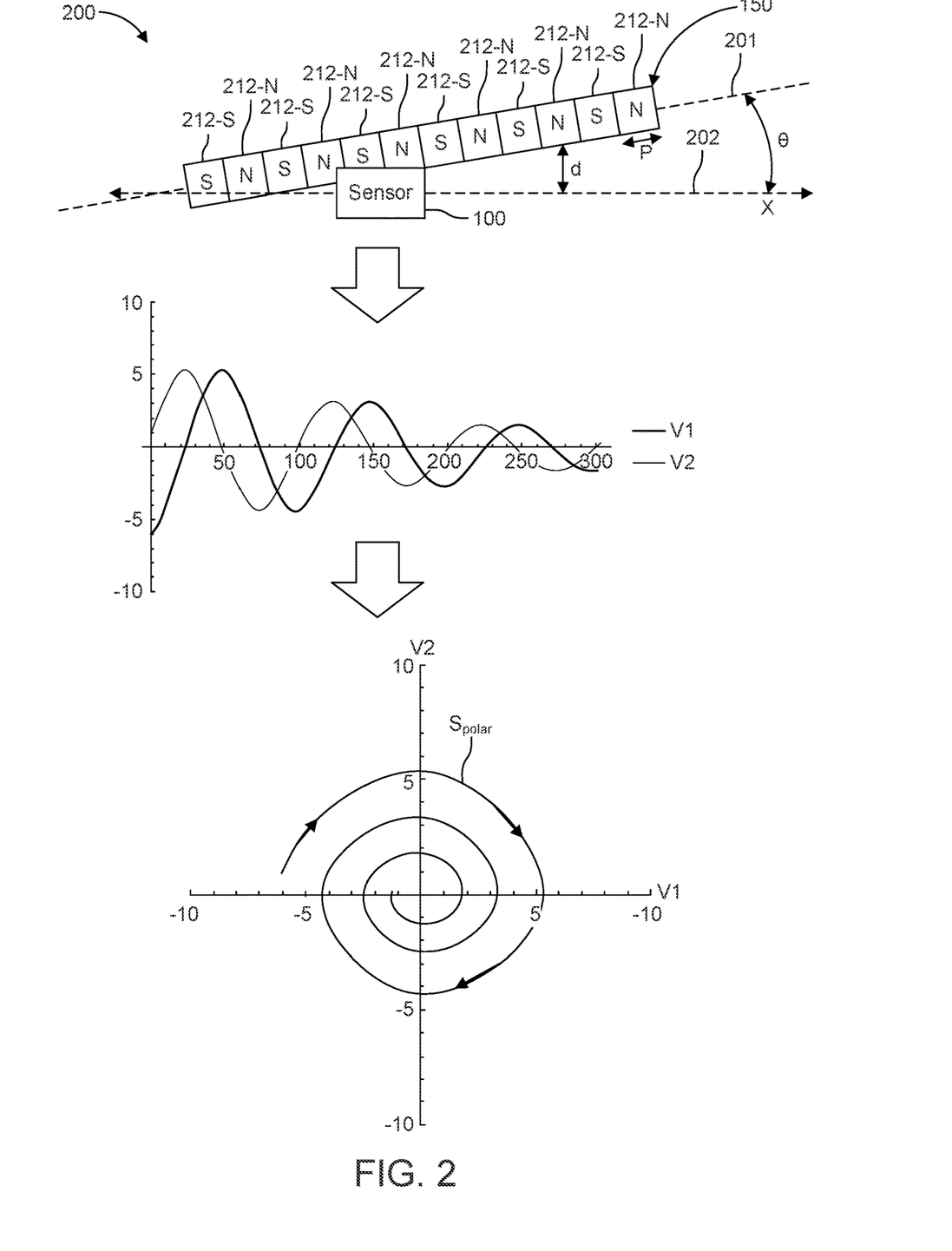
FIG. 2 is a top view of an absolute linear position system according to one or more embodiments.

FIG. 2 is a top view of an absolute linear position system 200 according to one or more embodiments. The absolute linear position system 200 includes the absolute linear position sensor 100 and the linear multipole strip magnet 150. The linear multipole strip magnet 150 has a plurality of pole pairs 212-S, 212-N extending along a multipole extension direction 201 (i.e., a magnet axis). The multipole extension direction 201 is also a center axis of the multipole strip magnet 150 that extends in a lengthwise dimension of the multipole strip magnet 150 and bisects the center of each pole 212-S, 212-N. Additionally, the magnetic south-poles and north-poles 212-S, 212-N of the multipole strip magnet 150 each have a width p corresponding to a pole pitch of the multipole strip magnet 150.

The position (e.g., distance) of the absolute linear position sensor 100 changes relative to the multipole strip magnet 150 as one of the two moves along a linear trajectory (path). For example, the multipole strip magnet 150 may be movably fixed, while the absolute linear position sensor 100 is configured to move along a linear path 202. The linear path 202 corresponds to the x-direction which is also the moving or shifting direction of the absolute linear position sensor 100. Alternatively, the absolute linear position sensor 100 may be movably fixed and the multipole strip magnet 150 may be configured to move along the multipole extension direction 201 used also as a linear path. In either case, the two lines 201 and 202 have an angular displacement φ from each other that is greater than zero.

Moreover, the linear path 202 vertically overlaps with the multipole strip magnet 150. Lines 201 and 202 may intersect at one end of the multipole strip magnet 150, but is not required.

As a result of the angular displacement φ, the strength of the magnetic field (e.g., the strength of the x-component of the magnetic field) varies linearly along the x-direction (i.e., along the linear path 202). As the absolute linear position sensor 100 moves along the linear path 202, the amplitude of the magnetic field changes based on two factors, including (1) a sinusoidal change due to the alternating arrangement of the magnetic north and south poles and (2) a linear change due an increasing or decreasing distance of the absolute linear position sensor 100 relative to the multipole strip magnet 150 (i.e., relative to the multipole extension direction 201). The linear change is a linear increase or a linear decrease in the peak-to-peak amplitude of the magnetic field along the linear path 202.

As the distance between the absolute linear position sensor 100 relative to the multipole strip magnet 150 increases, the strength (peak-to-peak amplitude) of the x-component of the magnetic field detectable at the absolute linear position sensor 100 decreases. Conversely, the distance between the absolute linear position sensor 100 relative to the multipole strip magnet 150 decreases, the strength (peak-to-peak amplitude) of the x-component of the magnetic field detectable at the absolute linear position sensor 100 increases.

The output signals V1 and V2 are representative of both the sinusoidal and linear changes that occur in the magnetic field strength in the x-component as the position (e.g., distance) of the absolute linear position sensor 100 changes relative to the multipole strip magnet 150. Thus, output signals V1 and V2 are both damping sinusoidal signals that are 90° phase shift relative to each other. The sinusoids of output signals V1 and V2 undergo a linear change in peak-to-peak amplitude as the absolute linear position sensor 100 moves along the linear path 202. As the sensor 100 moves in the positive x-direction, the distance between the sensor 100 and the multipole strip magnet 150 increases and the sinusoids of output signals V1 and V2 decrease in amplitude. As the sensor 100 moves in the negative x-direction, the distance between the sensor 100 and the multipole strip magnet 150 decreases and the sinusoids of output signals V1 and V2 increase in amplitude. Thus, the linear amplitude of the sinusoids is dependent on the absolute linear position of the absolute linear position sensor 100 changes relative to the multipole strip magnet 150 and therefore also dependent on the absolute linear position of the sensor 100 on the linear path 202.

As noted above, the converter 130 is configured to convert the two output signals V1 and V2 from (V1, V2 space) into a measurement signal Spolar in a polar coordinate space (θ, r), where θ is an angular coefficient and r is a radius coefficient. This conversion is illustrated in FIG. 2 by plotting V1 on an x-axis and plotting V2 on a y-axis. The result is a representation of the measurement signal Spolar that has a spiral pattern that decreases in amplitude as the sensor 100 moves in the positive x-direction along the linear path 202 and that increases in amplitude as the sensor 100 moves in the negative x-direction along the linear path 202. The spiral pattern is at a maximum amplitude when the sensor 100 is located over the left-most side of the multipole strip magnet 150. The amplitude of the measurement signal Spolar continuously increases or decreases based on the linear movement of the sensor 100 according to the spiral pattern.

The above-described principle can be described as using two decreasing/increasing sinusoidal signals V1 and V2 from two discrete linearized XMR bridges to measure the absolute position by having a linearly decreasing/increasing magnetic field change over the linear movement.

Figure 3:
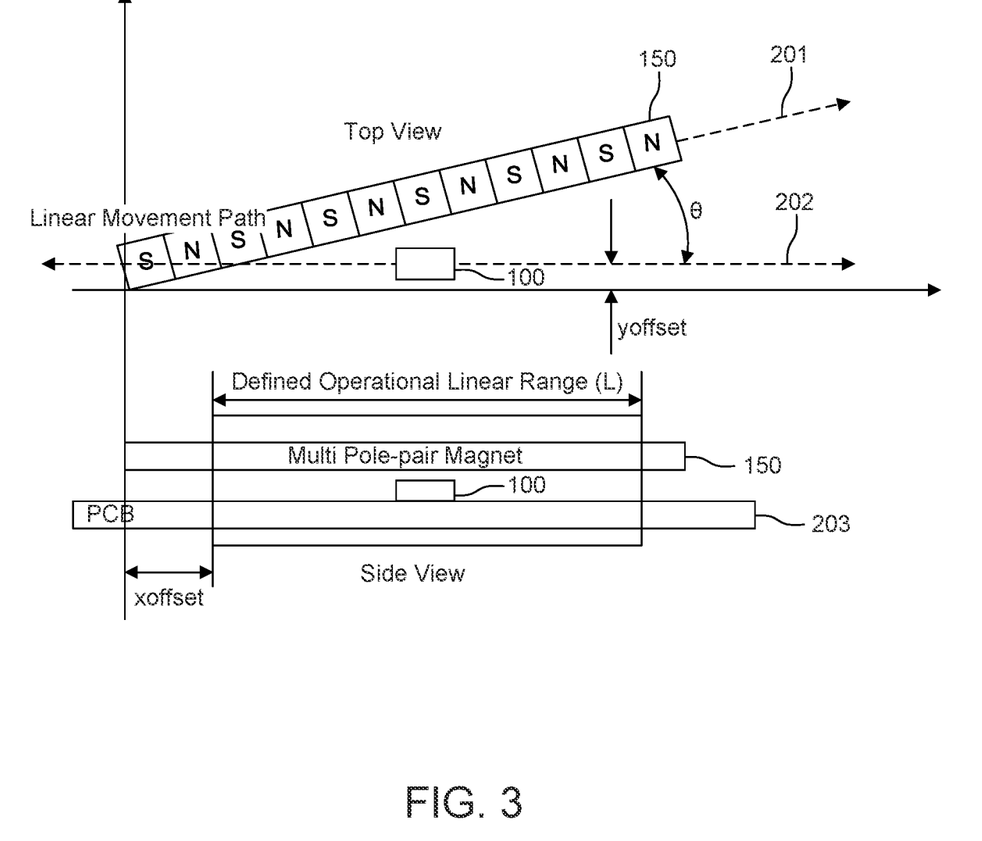
FIG. 3 is the top view of the absolute linear position system with a corresponding side view of the absolute linear position system according to one or more embodiments.

FIG. 3 is the top view of the absolute linear position system 200 with a corresponding side view of the absolute linear position system 200 according to one or more embodiments. In the top view, the sensor 100 is arranged on a printed circuit board (PCB) 203 with a y-offset relative to the multipole strip magnet 150 so that the linear path 202 intersects with the multipole extension direction 201 at a predetermined location (e.g., over a first magnetic pole arranged at an end of the multipole strip magnet 150). In addition, in the side view, an operational linear range L is defined. The operational linear range L is a movement range in which the sensor 100 can be moved and mapped to an absolute linear position within that range.

For example, an outer endpoint of the spiral pattern of measurement signal Spolar is mapped to a left edge of the operational linear range L and an inner endpoint of the spiral pattern of measurement signal Spolar is mapped to a right edge of the operational linear range L. The sensor circuit 120 is unable to calculate an absolute linear position when the sensor 100 moves outside of the operational linear range L. Accordingly, the operational linear range L is defined by a predetermined x-offset relative to the multipole strip magnet 150.

The absolute position calculation unit 140 is configured to determine the absolute linear position of the sensor 100 along the linear path 202 within the operational linear range L by evaluating the polar coordinate P(θ, r) of the measurement signal Spolar. That is, it evaluates both the angular component θ of the measurement signal Spolar with respect to the V1 and V2 axes and the radial component (i.e., the amplitude component) of the measurement signal Spolar. The angular component θ of the measurement signal Spolar repeats, as is the nature of the spiral pattern. However, when the angular component θ is considered in combination with the radial component r, a precise position can be determined. In other words, the polar coordinate P(θ, r) measurement signal Spolar is unique to the absolute linear position of the sensor 100 along the linear path 202 within the operational linear range L. There is a one-to-one correspondence with the polar coordinate P(θ, r) and the absolute position.

Figure 4A:
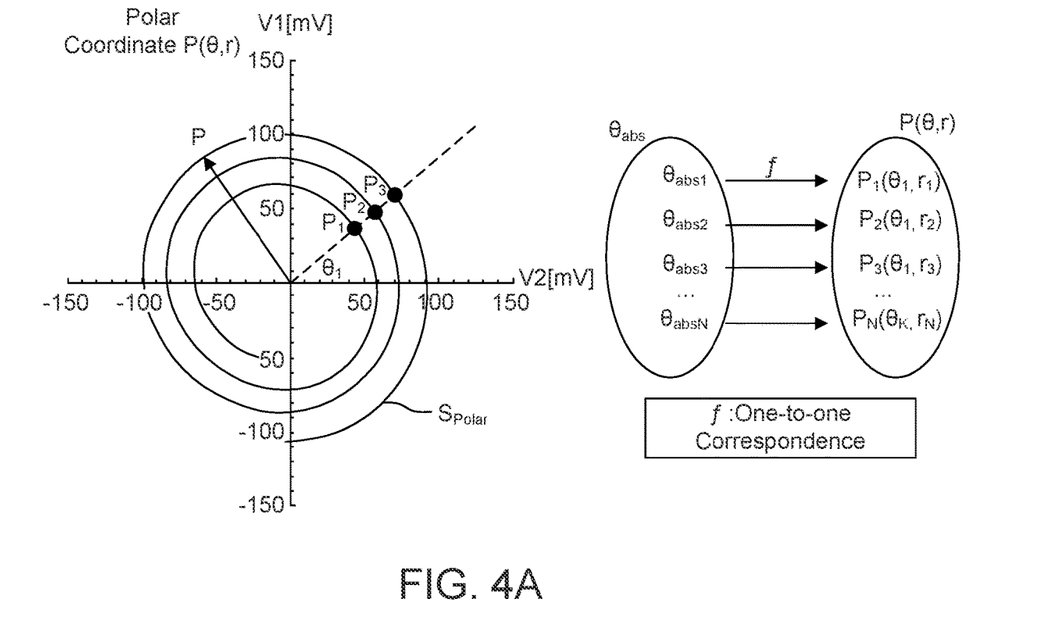
FIGS. 4A and 4B illustrate a determination of an absolute angle from a single point, polar coordinate $P(\theta, r)$ measurement according to one or more embodiments.
Figure 4B:
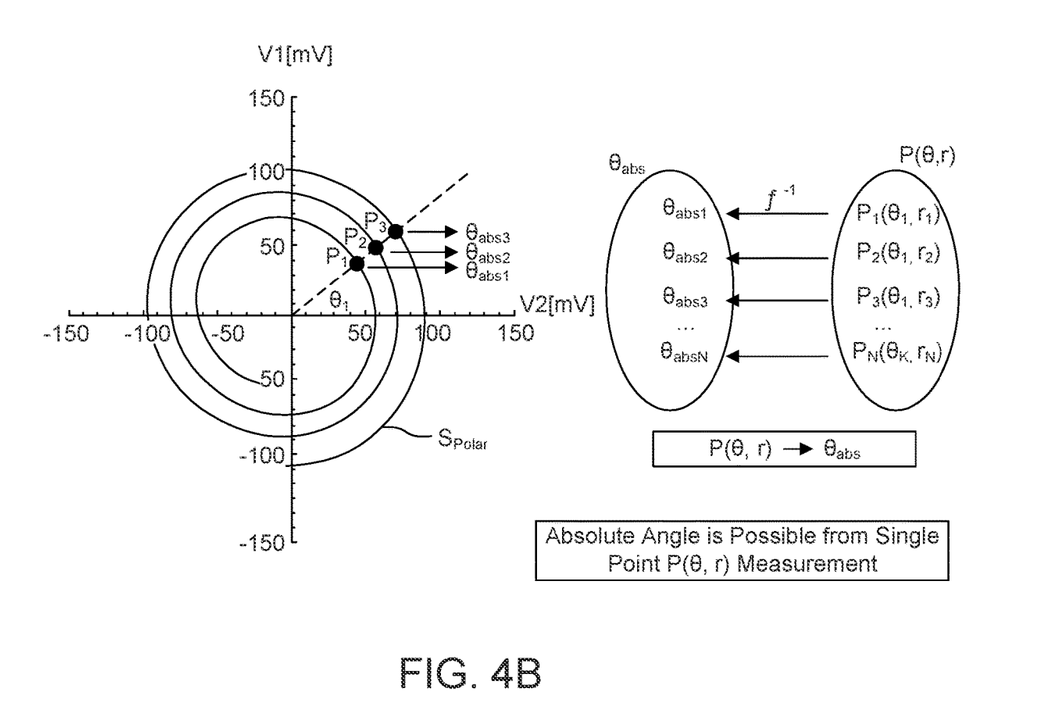

FIGS. 4A and 4B illustrate a determination of an absolute angle from a single point, polar coordinate P(θ, r) measurement according to one or more embodiments. The absolute position calculation unit 140 then converts the absolute angle into an absolute linear position of the sensor 100 along the linear path 202 within the operational linear range L by applying an absolute angle-to-position conversion algorithm (e.g., Equation 1).

In FIG. 4A, multiple absolute angles $\theta_{abs1}$, $\theta_{abs2}$, $\theta_{abs3}$, ... $\theta_{absN}$ are mapped via a function to a respective polar coordinate $P_1(\theta_1, r_1)$, $P_2(\theta_1, r_2)$, $P_3(\theta_1, r_3)$, ... $P_N(\theta_K, r_J)$, where J and K are arbitrary integers and N is the number of polar coordinates. The applied function f establishes a one-to-one correspondence between each absolute angle and a different polar coordinate P. Alternatively, it is possible that a mapping can be performed directly between absolute linear positions and respective polar coordinates. In other words, the applied function establishes a one-to-one correspondence between each absolute linear position along the linear path 202 within the operational linear range L and a different polar coordinate P. Moreover, the absolute angles can be respectively linked to an absolute linear position and be used to further determine the absolute linear position based on their correspondence.

Alternatively, the absolute position calculation unit 140 may include a look-up table (LUT) that stores absolute angle values linked to polar coordinates and the LUT outputs an absolute angle that corresponds to a measured polar coordinate P(θ, r) received from converter 130. Alternatively, the absolute position calculation unit 140 may include a LUT that stores absolute linear positions linked to polar coordinates and the LUT outputs an absolute linear position that corresponds to a measured polar coordinate P(θ, r) received from converter 130.

In FIG. 4B, the absolute position calculation unit 140 is configured to determine the polar coordinate P(θ, r) of the measurement signal Spolar by extracting the angular component θ and the radial component r therefrom, and apply the inverse function of function f (i.e., inverse function $f^{-1}$) to calculate the absolute angle or the absolute linear position. In this case, the absolute position calculation unit 140 determines an absolute angle by using the measured polar coordinate P(θ, r) in the inverse function $f^{-1}$.

Once the absolute position calculation unit 140 calculates the absolute angle $\theta_{abs}$, it can calculate the absolute linear position according to Equation 1:

$$\text{position} = \frac{p}{\pi} \theta_{abs}, \qquad \text{Eq. (1)}$$

where p is the pole pitch of the multipole strip magnet 150. The position output signal Spos has a value that is representative of the calculated absolute linear position.

The spiral of the measurement signal Spolar can be modeled using the Euler formula according to Equation 2:

$$\text{Spiral}(\theta_{abs}) = A e^{-d\theta_{abs}} e^{i(\theta_{abs} + \phi_0)} + c \qquad \text{Eq. (2),}$$

wherein A denotes an initial amplitude, d denotes a damping coefficient, c denotes a spiral offset value (complex number), $\phi_0$ denotes an initial phase, and i denotes an imaginary number. The coefficients A, d, c, and $\phi_0$ are model parameters that can be determined from measurement points during end of line (EOL) testing of the sensor system 200. The model parameters (A, d, $\phi_0$, c) of spiral function Spiral(θabs) can be obtained by using regression (curve fitting) from the measured data with known absolute angle θabs used as a reference in EOL by sensor circuit 120. After this calibration process, the final calculated parameter values of the spiral model are stored in sensor circuit 120.

The absolute angle $\theta_{abs}$ is calculated according to Equations 3, 4, 5, and 6:

$$\theta_{abs} = \theta_m - \theta_0 \qquad \text{Eq. (3),}$$

$$\theta_m = \text{ATAN 2}(V1, V2) \qquad \text{Eq. (4),}$$

$$\theta_0 = \text{ATAN 2}(V1_0, V2_0) \qquad \text{Eq. (5),}$$

$$r = \text{sqrt}(V1^2 + V2^2) \qquad \text{Eq. (6),}$$

where $\theta_m$ denotes a measured relative angle of the measured polar coordinate P($\theta_m$, r), $\theta_0$ denotes a measured angle at an initial position, $V1_0$ denotes the value of V1 at the initial position, $V2_0$ denotes the value of V2 at the initial position, r denotes a measured radius of the measured polar coordinate P($\theta_m$, r), and sqrt denotes a square root function. ATAN is the arc tangent of its two input values (e.g., ATAN2(V1/V2), also denoted $\tan^{-1}$.

Figure 5:
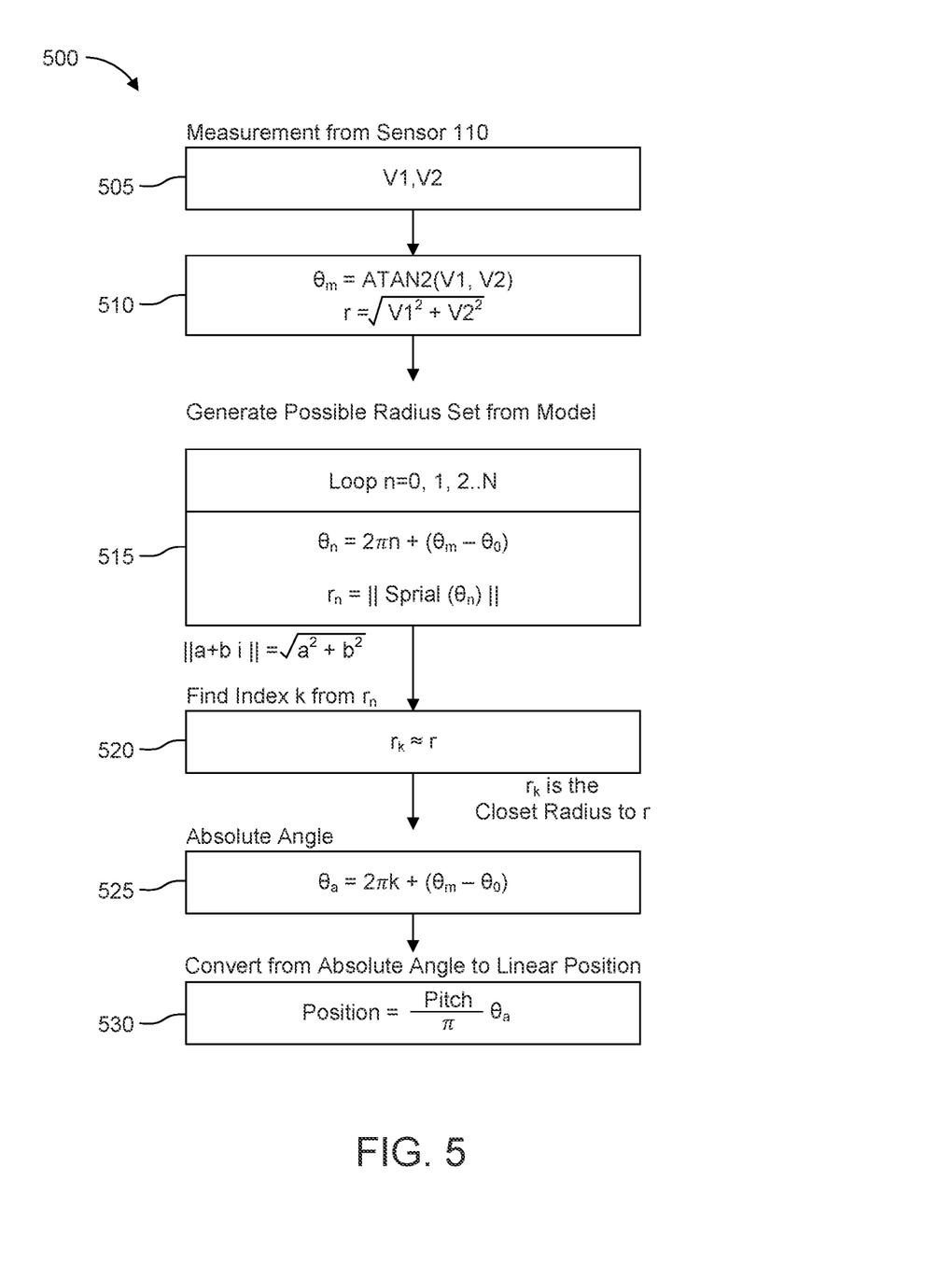
FIG. 5 is a flow diagram of a method for calculating an absolute linear position in run time according to one or more embodiments.

FIG. 5 is a flow diagram of a method 500 for calculating an absolute linear position in run time according to one or more embodiments. The flow diagram 500 is a calculation flow implemented by the senor circuit 120 (i.e., by the converter 130 and the absolute position calculation unit 140).

The converter 130 receives the output signals V1 and V2 from the magnetic field sensor 110 and calculates the polar coordinates Om and r according to Equations 4 and 6 (operations 505 and 510).

The absolute position calculation unit 140 receives the polar coordinates $\theta_m$ and r and in operation 515 generates the possible radius set $r_{set} = \{r_0, r_1, r_2, \ldots, r_N\}$ by looping Equations 7 and 8 from n=0, 1, 2, . . . N.

$$\theta_n = 2\pi n + (\theta_m - \theta_0) \qquad \text{Eq. (7),}$$

$$r_n = \|\text{Sprial}(\theta_n)\| \qquad \text{Eq. (8),}$$

where N denotes the integer part of a maximum number of turns in a spiral trajectory. For example: if the spiral has 3 turns then N becomes 3, if spiral has 4.5 turns, N becomes 4. It can be expressed as N=⌊number of maximun turn⌋, ⌊x⌋ notation in mathematics means the floor(x) function in software language. Here are several ⌊x⌋ function examples: ⌊3.14⌋=3, ⌊3.97⌋=3, ⌊4⌋=4. Therefore, N is predefined integer number which is determined by system design. N can be calculated from N=⌊$\theta_{\alpha\_max}$/360⌋, where $\theta_{\alpha\_max}$ is the maximum absolute angle which is the same as the maximum number of spiral turns*360 degrees.

In operation 520, the absolute position calculation unit 140 determines an index k from $r_n$, wherein the index k corresponds to one of the stored models of different spiral patterns. Radius $r_k$ is the closest radius within one of the stored models to measured radius r. Accordingly, the corresponding model is selected based on the measured radius r. In particular, in operation 520, the absolute position calculation unit 140 determines an index k. The index k can be obtained by selecting the one element $r_n$ from $r_{set}=\{r_0, r_1, r_2, \ldots, r_N\}$ wherein $r_n$ is the closest value to the measured r value. If the $r_n$ is selected as the closest to the measured r value then k become n(k=n). For example, assuming the following case:

N=3, $r_{set}=\{r_0=2.3, r_1=3.5, r_2=4.7, r_3=6.9\}$ which is obtained from operation 515

The measured r value=4.6

If the measured r=4.6, then the closest element $r_{ii}$ to the measured r value from $r_{set}$ is $r_2$=4.7, then k becomes 2. This means that the measured point P has 2 full turns+($\theta_m - \theta_0$) of rotations. In other words, it takes two full turns plus an additional value of ($\theta_m - \theta_0$) following the spiral trajectory from the spiral center to arrive at P.

Once the index k is determined from $r_n$, the absolute position calculation unit 140 can calculate the absolute angle $\theta_{abs}$ using Equation 9 (operation 525).

$$\theta_{abs} = 2\pi k + (\theta_m - \theta_0) \qquad \text{Eq. (9).}$$

Once the absolute angle $\theta_{abs}$ is determined, the absolute position calculation unit 140 calculates the absolute linear position using Equation 1 (operation 530).

FIGS. 6A-6D illustrate absolute linear position systems with alternative magnet-sensor arrangements according to one or more embodiments. Each magnet-sensor arrangement produces a linear change in the peak-to-peak amplitude of the magnetic field strength as the absolute linear position of the sensor 100 changes relative to a magnet. For example, the field strength of the magnetic field produced by the magnet linearly changes along a linear trajectory (e.g., linear path 202). The magnet may be movably fixed and the sensor 100 may be configured to change its position along linear path 202. In this case, the field strength of the magnetic field produced is different at each position along linear path 202 according to the linear change, along with a sinusoidal change. Alternatively, the sensor 100 may be movably fixed and the magnet may be configured to move along center axis 201. In this case, the field strength of the magnetic field produced the magnet at the position of the stationary sensor 100 linearly changes as the magnet moves along its linear trajectory.

Figure 6A:
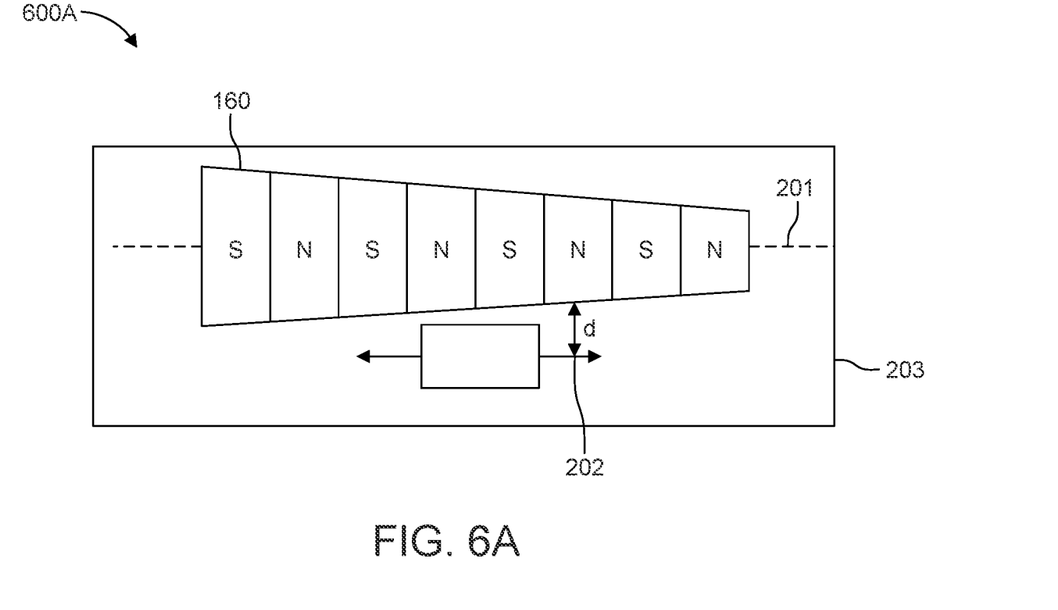
FIGS. 6A-6D illustrate absolute linear position systems with alternative magnet-sensor arrangements according to one or more embodiments.

FIG. 6A illustrates a top view of an absolute linear position system 600A that includes the sensor 100 and a multipole strip magnet 160 that has a tapered shape. Here, the center axis 201 of the magnet 160 and the linear path 202 are parallel to each other (i.e., the displacement angle φ is zero). However, due to the tapered shape of the multipole strip magnet 160, the strength of the magnetic field along the linear path undergoes a linear change, with the strength (peak-to-peak amplitude) being the highest at the thickest portion of the magnet 160 (i.e., on the left side) and the strength (peak-to-peak amplitude) being the lowest at the thinnest portion of the magnet 160 (i.e., on the right side). Accordingly, as the sensor 100 moves along the linear path 202, the measured magnetic field undergoes both a sinusoidal change due to the alternating north and south poles and a linear change in peak-to-peak amplitude due to the tapered shape of the magnet 160. The sensor 100 is configured to determine its absolute linear position along its linear path 202 or determine the absolute linear (minimum) distance d from magnet 160 using any of the above-described methods.

Figure 6B:
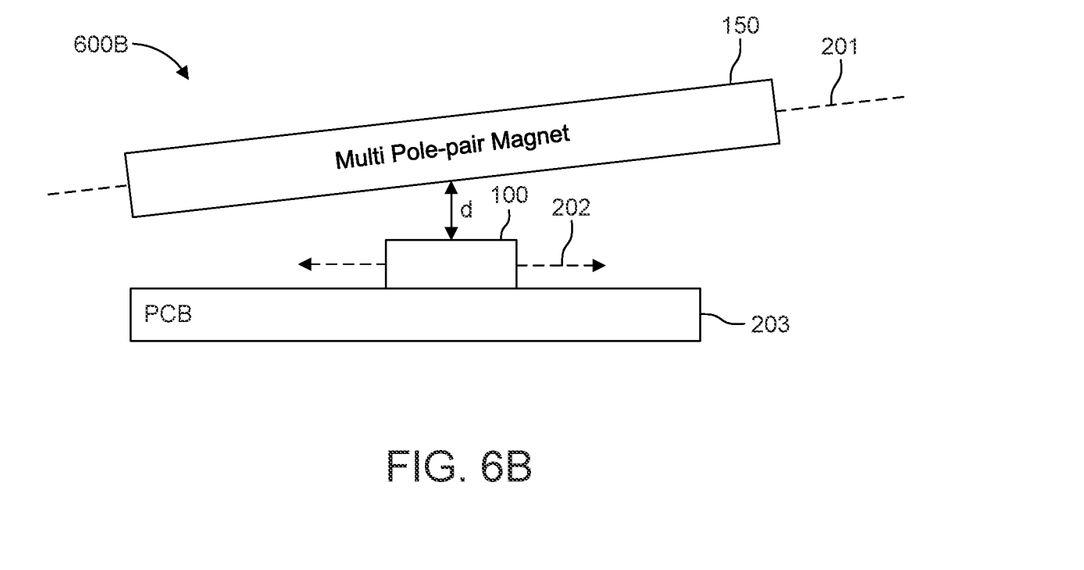

FIG. 6B illustrates a side view of an absolute linear position system 600B that includes the sensor 100 and a multipole strip magnet 150 that is tilted vertically in the XZ plane with respect to the sensor 100 instead of being tilted horizontally in the XY plane, as was the case in FIGS. 2 and 3. Accordingly, the vertical distance between the sensor 100 and a multipole strip magnet 150 changes along the linear path 202. The closer the sensor 100 is to the multipole strip magnet 150, the stronger the magnetic field. Accordingly, as the sensor 100 moves along the linear path 202, the measured magnetic field undergoes both a sinusoidal change due to the alternating north and south poles and a linear change in peak-to-peak amplitude due to the change in distance d of the magnet 150 from the linear path 202. The sensor 100 is configured to determine its absolute linear position along its linear path 202 or determine the absolute linear (minimum) distance d from magnet 150 using any of the above-described methods.

Figure 6C:
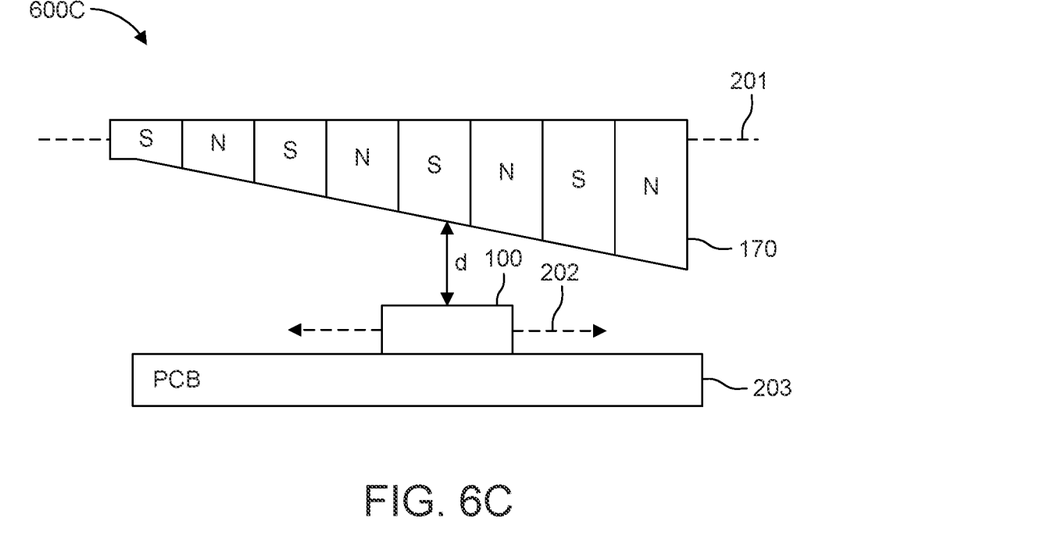

FIG. 6C illustrates a side view of an absolute linear position system 600C that includes the sensor 100 and a multipole strip magnet 170 that has a tapered shape. The absolute linear position system 600C is similar to the absolute linear position system 600A shown in FIG. 6A, except the magnet 170 is vertically tapered instead of horizontally tapered. Accordingly, the strength of the magnetic field along the linear path 202 undergoes a linear change. As the sensor 100 moves along the linear path 202, the measured magnetic field undergoes both a sinusoidal change due to the alternating north and south poles and a linear change in peak-to-peak amplitude due to the tapered shape of the magnet 170. The sensor 100 is configured to determine its absolute linear position along its linear path 202 or determine the absolute linear (minimum) distance d from magnet 170 using any of the above-described methods.

Figure 6D:
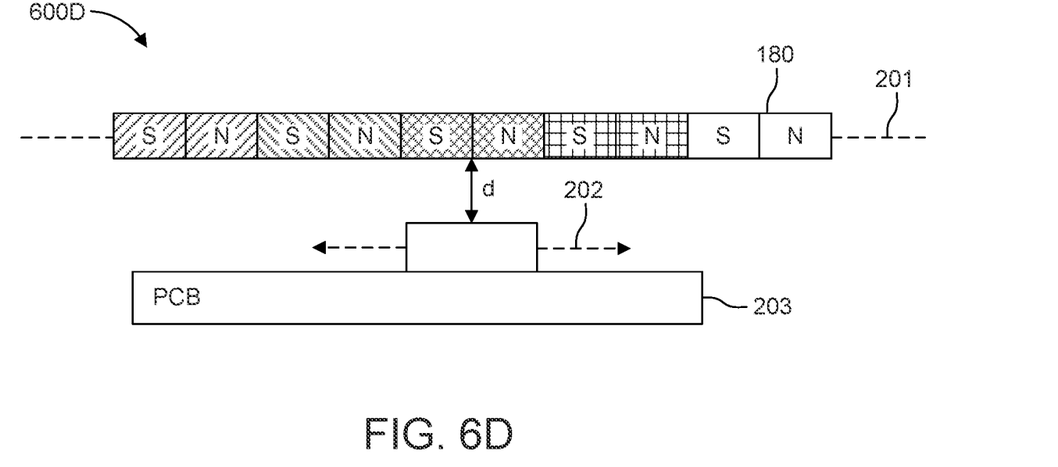

FIG. 6D illustrates a side view of an absolute linear position system 600D that includes the sensor 100 and a multipole strip magnet 180 that has a magnetization gradient from one end of the magnet to the opposite end of the magnet along its center axis 201. Thus, the direction of magnetization gradient is parallel to the linear path 202. For example, the magnetization may be strongest on the left side of the magnet 180 and weakest on the right side of the magnet 180, or vice versa. Thus, the magnetic field strength produced by the magnet changes linearly in peak-to-peak amplitude from its left side to its right side and vice versa due to magnetization gradient. As a result, the peak-to-peak amplitude of the magnetic field strength changes linearly along the linear path 202 despite the distance d between the sensor 100 and the magnet 180 can remaining constant.

Accordingly, as the sensor 100 moves along the linear path 202, the measured magnetic field undergoes both a sinusoidal change due to the alternating north and south poles and a linear change due to the magnetization gradient. The sensor 100 is configured to determine its absolute linear position along its linear path 202 using any of the above-described methods.

While various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An absolute position measurement system, comprising:
    a multipole magnet comprising alternating magnetic poles extending along a multipole extension direction, wherein the multipole magnet has a linear changing configuration relative to a linear path and the multipole magnet is configured to produce a magnetic field along the linear path; and
    a magnetic sensor configured to move along the linear path, wherein the magnetic sensor comprises a first sensor element arrangement configured to generate a first sensor signal in response to the magnetic field and a second sensor element arrangement configured to generate a second sensor signal in response to the magnetic field, wherein, as the magnetic sensor moves along the linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform, wherein the magnetic sensor further comprises a processing circuit configured to:
  receive the first sensor signal and the second sensor signal,
  calculate a polar coordinate based on the first sensor signal and the second sensor signal,
  generate a radius set based on the polar coordinate,
  calculate an absolute angle based on a radius included in the radius set, and
  calculate an absolute position of the magnetic sensor based on the absolute angle.

2. The absolute position measurement system of claim 1, wherein:
  the first sensor element arrangement comprises a first plurality of sensor elements that are sensitive to an in-plane magnetic field component of the magnetic field, and
  the second sensor element arrangement comprises a second plurality of sensor elements that are sensitive to the in-plane magnetic field component of the magnetic field.

3. The absolute position measurement system of claim 2, wherein the in-plane magnetic field component is aligned with the linear path.

4. The absolute position measurement system of claim 2, wherein:
  the first sensor element arrangement is a first sensor bridge circuit,
  the second sensor element arrangement is a second sensor bridge circuit, and
  the first sensor bridge circuit and the second sensor bridge circuit are arranged in-plane and are spaced apart along a sensor axis.

5. The absolute position measurement system of claim 1, wherein the polar coordinate includes an angular component and a radius component, and
  wherein the polar coordinate is unique to the absolute position of the magnetic sensor.

6. The absolute position measurement system of claim 1, wherein: the processing circuit is configured to generate a polar coordinate signal based on the first sensor signal and the second sensor signal, wherein the polar coordinate signal is indicative of the absolute position of the magnetic sensor.

7. The absolute position measurement system of claim 6, wherein, as the magnetic sensor moves along the linear path, the polar coordinate signal has a spiral pattern whose amplitude changes based on the linear changing configuration of the multipole magnet.

8. The absolute position measurement system of claim 7, wherein the processing circuit is configured to determine based on a maximum number of turns associated with the spiral pattern.

9. The absolute position measurement system of claim 1, wherein the absolute position is an absolute linear position of the magnetic sensor on the linear path.

10. The absolute position measurement system of claim 1, wherein the absolute position is an absolute distance of the magnetic sensor from the multipole magnet.

11. The absolute position measurement system of claim 1, wherein the second sinusoidal waveform is phase shifted 90° with respect to the first sinusoidal waveform.

12. The absolute position measurement system of claim 1, wherein the multipole extension direction intersects with the linear path intersect.

13. The absolute position measurement system of claim 1, wherein the multipole magnet has a linear tapered shape relative to a linear path.

14. The absolute position measurement system of claim 1, wherein the multipole magnet has a linear magnetization gradient along the multipole extension direction such that a strength of the magnetic field linearly changes along the linear path according to the linear magnetization gradient.

15. An absolute position measurement system, comprising:
  a multipole magnet comprising alternating magnetic poles extending along a multipole extension direction, wherein the multipole magnet has a linear changing configuration relative to a linear path and the multipole magnet is configured to produce a magnetic field along the linear path, the magnetic field having a field strength that undergoes a sinusoidal change along the linear path due to the alternating magnetic poles and a linear change along the linear path according to the linear changing configuration relative to the linear path; and
  a magnetic sensor configured to move along the linear path,
  wherein the magnetic sensor comprises a first sensor element arrangement configured to generate a first sensor signal and a second sensor element arrangement configured to generate a second sensor signal that is phase shifted with respect to the first sensor signal,
  wherein the magnetic sensor further comprises a processing circuit configured to:
    receive the first sensor signal and the second sensor signal,
    calculate a polar coordinate based on the first sensor signal and the second sensor signal,
    generate a radius set based on the polar coordinate,
    calculate an absolute angle based on a radius included in the radius set, and
    calculate an absolute position of the magnetic sensor based on the absolute angle.

16. The absolute position measurement system of claim 15, wherein, as the magnetic sensor moves along the linear path, the first sensor signal has a first sinusoidal waveform having a first linearly changing peak-to-peak amplitude and the second sensor signal has a second sinusoidal waveform having a second linearly changing peak-to-peak amplitude,
  wherein the second sinusoidal waveform is phase shifted with respect to the first sinusoidal waveform.

17. The absolute position measurement system of claim 15, wherein the polar coordinate includes an angular component and a radius component, and
  wherein the polar coordinate is unique to the absolute position of the magnetic sensor.

18. The absolute position measurement system of claim 15, wherein the absolute position is an absolute linear position of the magnetic sensor on the linear path.

19. The absolute position measurement system of claim 15, wherein the absolute position is an absolute distance the magnetic sensor from the multipole magnet.

20. An absolute position measurement system, comprising:
a multipole magnet comprising alternating magnetic poles extending along a multipole extension direction that is coincident with a linear path along which the multipole magnet is configured to move, wherein the multipole magnet has a linear configuration that changes relative to a fixed position as it moves along the linear path, wherein the multipole magnet is configured to produce a magnetic field at the fixed position; and
a magnetic sensor movably fixed at the fixed position,
wherein the magnetic sensor comprises a first sensor element arrangement configured to generate a first sensor signal in response to the magnetic field and a second sensor element arrangement configured to generate a second sensor signal in response to the magnetic field,
wherein, as the multipole magnet moves along the linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform,
wherein the magnetic sensor further comprises a processing circuit configured to:
receive the first sensor signal and the second sensor signal,
calculate a polar coordinate based on the first sensor signal and the second sensor signal,
generate a radius set based on the polar coordinate,
calculate an absolute angle based on a radius included in the radius set, and
calculate an absolute position of the magnetic sensor based on the absolute angle.

21. A method of measuring an absolute position of a magnetic sensor, the method comprising:
generating, by a first sensor element arrangement of the magnetic sensor, a first sensor signal in response to a magnetic field;
generating, by a second sensor element arrangement of the magnetic sensor, a second sensor signal in response to the magnetic field,
wherein, as the magnetic sensor moves along a linear path, the first sensor signal has a first sinusoidal waveform having a first linearly changing peak-to-peak amplitude and the second sensor signal has a second sinusoidal waveform having a second linearly changing peak-to-peak amplitude, wherein the second sinusoidal waveform is phase shifted with respect to the first sinusoidal waveform;
calculating a polar coordinate based on the first sensor signal and the second sensor signal;
determining a radius based on the polar coordinate;
calculating an absolute angle based on the radius; and
calculating, by a processing circuit, an absolute position of the magnetic sensor based on the absolute angle.

22. The method of claim 21, wherein the polar coordinate includes an angular component and a radius component, and
wherein the polar coordinate is unique to the absolute position of the magnetic sensor.

23. The method of claim 21, further comprising:
generating a polar coordinate signal based on the first sensor signal and the second sensor signal, wherein the polar coordinate signal comprises an angular component and a radius component in polar coordinate space, and
determining the angular component and the radius component.

* * * * *

UNITED STATES PATENT AND TRADEMARK OFFICE
CERTIFICATE OF CORRECTION

PATENT NO. : 12,013,235 B2  
APPLICATION NO. : 17/588540  
DATED : June 18, 2024  
INVENTOR(S) : Joo Il Park et al.

Page 1 of 1

It is certified that error appears in the above-identified patent and that said Letters Patent is hereby corrected as shown below:

In the Claims

Claim 8:
Column 15, Lines 66 and 67, change "based on a maximum number of turns associated with the spiral pattern." to --the radius based on a maximum number of turns associated with the spiral pattern.--

Signed and Sealed this  
Thirtieth Day of September, 2025

John A. Squires  
*Director of the United States Patent and Trademark Office*